United States Patent [19]
Nakamura et al.

[11] Patent Number: 5,368,661
[45] Date of Patent: Nov. 29, 1994

[54] METHOD FOR JOINING PARTS OF NI-TI ALLOYS WITH DIFFERENT METALS

[75] Inventors: Masayuki Nakamura, Yokohama; Kaisuke Shiroyama, Zama; Satoru Masunaga; Kazuo Murata, both of Fukui, all of Japan

[73] Assignees: The Furukawa Electric Co., Ltd., Tokyo; Masunaga Menlo Park Co., Ltd., Fukui, both of Japan

[21] Appl. No.: 76,797

[22] Filed: Jun. 15, 1993

Related U.S. Application Data

[62] Division of Ser. No. 865,036, Apr. 7, 1992, abandoned.

[30] Foreign Application Priority Data

Apr. 9, 1991 [JP] Japan .................. 3-103452

[51] Int. Cl.⁵ .................. C23C 30/00; B23K 31/02
[52] U.S. Cl. ................... 148/512; 148/527; 148/563; 228/125; 228/265
[58] Field of Search ............... 148/512, 516, 527, 528, 148/563; 228/125, 263.13, 263.21, 265

[56] References Cited

U.S. PATENT DOCUMENTS

3,950,841 4/1976 Conn .................. 228/125
4,637,962 1/1987 Albrecht et al. .......... 228/263.13

OTHER PUBLICATIONS

Cottenden, A. M., et al., "Hard Metal Interlayered Butt-Joints Made by Diffusion Bonding and Pressure Bonding," *Metals Technology*, Jun. 1981, pp. 221-232.

*Primary Examiner*—George Wyszomierski
*Attorney, Agent, or Firm*—Oblon, Spivak, McClelland, Maier & Neustadt

[57] ABSTRACT

Composite parts of Ni-Ti alloys joined to a different metal have a melt forged structure obtained through the reactive fusion of both metals, initiated by the fusion of at least one metal bordering on the joint interface and the application of pressure; a hot forged structure of Ni-Ti alloy obtained through softening the alloy at high temperature and applying pressure on the Ni-Ti alloy side of the joint; and a hot forged structure of the different metal obtained by softening the metal at high temperature and applying pressure on the different metal side of the joint.

4 Claims, 7 Drawing Sheets

METHOD FOR JOINING PARTS OF NI-TI ALLOYS WITH DIFFERENT METALS

This is a division of application Ser. No. 07/865,036, filed on Apr. 7, 1992, now abandoned.

BACKGROUND OF THE INVENTION

1. Field of the Invention

The present invention relates to high-strength joined parts of Ni-Ti alloys, in particular, a Ni-Ti alloy component having shape memory characteristics or superelasticity characteristics joined to a different metal alloy, and a joining method therefor.

2. Description of the Related Art

The shape memory effect and the superelasticity effect aforementioned both result from a thermoelastic Martensitic transformation with small transformation hysteresis. The shape memory effect is a phenomenon wherein a deformation which takes place in the Martensite temperature range returns to the original undeformed shape when heated above the Martensite inverse transformation temperature (Austenite transformation). On the other hand, the superelasticity effect is a phenomenon wherein a material deformed in the Austenite temperature range recovers elastically as much as 8% deformation strain without the heating as above by the stress-induced Martensite transformation accompanied with deformation.

Among the technologically advanced materials exhibiting such shape memory and superelasticity effects are certain Ni-Ti alloys. Products exhibiting shape memory effect prepared from these Ni-Ti alloys include blow-out ports of air controllers, pressure-regulating valves of rice-cooking jars, medical bone plates, etc. Products wherein the superelasticity effect is utilized in practice include orthodontic wires, brassiere cup wires, spectacle frames, medical guide wires, etc.

Further development in related technologies often requires creating composite structures. Preparation of such structures requires a joining technique for joining Ni-Ti alloys with different metals.

The Ni-Ti alloys of concern are rather specific alloys exhibiting ductility while yet being intermetallic compounds. The compositional range is in the vicinity of a ratio of Ni to Ti of 1:1 in terms of atomic ratio, occasionally with an extremely narrow range of additional metals added thereto. If this ratio shifts slightly, the alloys become brittle rapidly. Moreover, since these alloys have high activity in the chemical sense, they react easily with many metals such as Fe, Cu and Ni to produce a brittle reaction phase. The production of this reaction phase makes welding and soldering Ni-Ti alloys to different metal materials difficult.

Conventionally, with respect to the joining of Ni-Ti alloys, Ni-Ti alloys can be easily joined to themselves by fusion welding methods such as laser welding, TIG welding and electronic beam welding, or by pressure welding methods such as upset butt welding, flash butt welding and friction pressure welding. Upset butt welding is generally considered superior with respect to strength.

However, techniques allowing Ni-Ti alloys and different metals other than said alloys to be directly welded while maintaining high strength has not previously been known. This is due to the fact that because of the high activity of Ni-Ti alloys, these alloys react easily with mating metals such as Fe, Cu, Ni, etc. during welding to produce a brittle reaction phase. Regardless of which welding methods aforementioned might be used, a brittle reaction phase is produced in the joined area, making it impossible to obtain the strength required for practical use.

For this reason, the direct welding of Ni-Ti alloys with different metals has been said to be impossible. As a substitute, the following two methods have been adopted as conventional joining techniques.

One such method is mechanical joining, for example, by such means as crimping with rivets, etc. and fastening with screws, methods which have the defect that the joined parts became large and subject to becoming loose due to repeated working.

Another method is plating/soldering. In this method, the joining face of the Ni-Ti alloy component is plated beforehand with an easily solderable metal, e.g. nickel, copper alloy or the like, and soldering with the mating component is performed on this plating, thereby preventing the reaction between the Ni-Ti alloy and the fusible metal brazing material, thereby achieving a stabilized joint. Because of the dependence of the joint strength on the adhesive strength of plating to the Ni-Ti substrate, however, joining of parts expected to be subject to high stress was impossible.

OBJECT OF THE INVENTION

The present invention was made with a view to solving the problems addressed above, and pertains to a joining method for firmly joining a Ni-Ti component to another metal component without damaging the characteristics of the Ni-Ti alloys, by eliminating the brittle reaction phase produced on fusing when directly joining a component comprising a Ni-Ti alloy with a component comprising a different metal or different alloy by welding. The invention further pertains to joined parts obtained by such a method.

BRIEF DESCRIPTION OF THE DRAWINGS

The numerals in the figures pertain to the following:
1. Compression device
2. Welding power source
3. Superelasticity wire material
4. Different metal wire material
5. 5' Air-cooling electrode jigs
6. Pressure device
7. Ni-Ti alloy round wire
8. Profile wire
9. Cast structure
10. Diffused layer
11. Melt forged structure
12. Hot forged structure of 51Ni-Ti
13. Hot forged structure of 87Ni-13Cr
14. Base material structure of 51Ni-Ti

DETAILED DESCRIPTION OF THE INVENTION

In the process of the subject invention, the parts of Ni-Ti alloy joined together with different metals are characterized in that the parts have, at the interface of the area joined, a melt forged structure obtained through the reactive fusion of both metals due to the fusion of at least one metal bordering on said interface under the application of pressure; a hot forged structure of Ni-Ti alloy obtained by softening said alloy at high temperature and applying pressure on the Ni-Ti alloy side of the joint; and a hot forged structure of said different metal or different metal alloy obtained by softening said different metal or metal alloy at high temperature and applying pressure on the different metal or metal alloy side of the melt forged structure.

The Ni-Ti shape memory alloy or superelasticity alloys comprise 40–60 at % Ni-Ti alloy, or a Ni-Ti alloy in which a part of Ni or Ti in this Ni-Ti alloy is substituted with one or more of Fe, Cr, Al, V, Pd, Ag, Mn, Mg, Co, Nb, Mo and Cu, in a range not exceeding 20 at % in total amount. If any of simple metals of Ni, Ti, Cu and Fe, Ni-based alloy, Ti-based alloy, Fe-based alloy and Cu-based alloy are used as the different metal or metal alloy, excellent effects can be obtained.

Moreover, the joining method of the invention is characterized in that the joining faces of the Ni-Ti alloy component and the different metal component comprise a melt forged structure obtainable through the reactive fusion of both components and the application of pressure, this melt forged structure formed along the joining interface by heating the parts to be joined to the fusion temperature of at least one of components over a short time, thus reactively fusing along the interface; and at the same time softening both components in the area bordering the fused interfacial area at high temperature, and by simultaneously applying high pressure to the parts to be joined, forming a hot forged structure of Ni-Ti alloy through the softening of the Ni-Ti alloy component at high temperature under pressure; and a hot forged structure of the different metal or metal alloy formed by softening the different metal component at high temperature and by applying pressure on the side of the different metal.

A further joining method of the invention comprises forming a thrust-out portion with cast structure around the outer circumference of the joining interface by compressing the joined parts with a pressure of not less than 2 kg/mm$^2$ through both components, thus thrusting out fused material from the joined interfacial area to the outside. In this joining method, it is advantageous to cut off the thrust-out portion and to finish by polishing.

A still further joining method of the invention is characterized by implementing one of the previously described joining methods after heat-radiating structures consisting of material of high thermal conductivity are attached to the side of the Ni-Ti alloy component and the side of the different metal component in the neighborhood of joining faces.

As indicated previously, a layer consisting of a melt forged structure of Ni-Ti alloy and different metal or metal alloy is formed at the joining interface and, across this on either side of the interface, layers of a hot forged structure of the respective metals are formed. For the purposes of the present invention, a melt forged structure implies a metal structure that has been solidified in the molten state while a pressurizing force has been transmitted to the melt by applying the pressure to the joining interface at the time when at least one metal material was molten at this joining interface, or by applying pressure continuously from a time prior to fusing. It is preferable for the melt forged structure to be formed in a thickness of not more than about 20 μm over the whole joining interface. Hence, it is sufficient that the melt produced by the local heating at the joining interface may be created in short time and in very small amount, the pressurizing force being applied to that slightly produced melt to solidification, thereby obtaining a thin layered melt forged structure.

Figure 7:
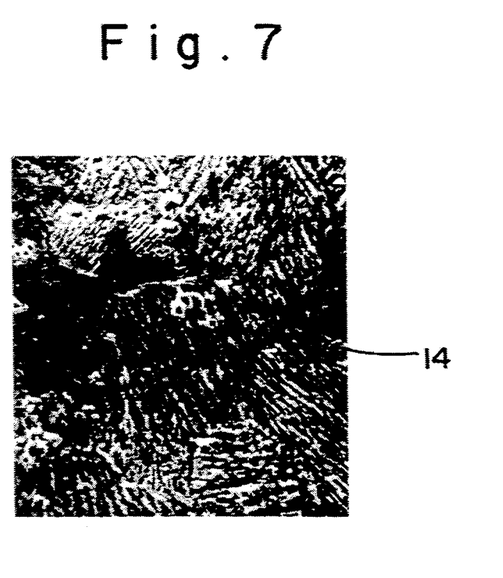
FIG. 7 is an enlarged photograph of metal structure (magnification: 700 times) showing the base material structure of 51.0 at % Ni-Ti alloy in the neighborhood of the joined area of FIG. 4.

However, when the fused phase is produced in large amount, or when a brittle reactively fused phase of Ni-Ti alloy and different metal is produced due to the heating conditions etc. at the joining interface, the strength of the joint will decrease. For example, referring to FIG. 7, when the end faces of 51.0 at % Ni-Ti alloy wire and 80 wt % Ni 20 wt % Cr alloy wire were butted against one another to perform conventional upset butt welding, two kinds of brittle phases of a cast structure (9) consisting of a fused reaction phase remaining at the joining interface and around its outer circumferential area; and a diffused layer (10) between liquid phase and solid phase, produced through the reaction between the fused product forced to the outside of the joint and the surface of the Ni-Ti alloy component is produced. The very rupture making these two layers as starting points is a primary cause of decreased joint strength.

In the present invention, the joint between the joined parts is strengthened in such a way that, for the total fused phase, the brittle, reactively fused phase and extra non-brittle, non-reactively fused phase are thrust to the outside of the components by the high temperature softening both the side of the different metal component and the side of the Ni-Ti alloy component on either side of the fused reaction phase, and by compressively processing the joining interface by applying pressure, and, at the same time, a melt forged structure is formed by forging the remaining minimal amount of fused phase and solidifying this phase. Further, since the pressurizing force is also applied to the areas softened by the high temperature on both sides of the melt forged structure, the hot forged structures are formed, serving for preventing stress concentration at the joined interface.

Here, while the minimum pressurizing force varies depending on the physical properties of different metals, not less than 2 kg/mm$^2$ are required in general. If the pressurizing force is under 2 kg/mm², the force required to thrust out the reactively fused phase etc. from the joining interface to the outside would be too low, and the forged structure obtained would also be insufficient.

Moreover, for preventing the production of a brittle diffused layer, it is important to suppress the melt produced at the joining interface to a small amount, thus minimizing the melt thrust out through the application of pressure to the joining interface. Hence, the heating of the parts to be joined is restricted to short times and local heating. Even when the amount of melt produced is too high, however, heat-radiating portions consisting of high thermal conductivity material may be attached beforehand to both components, i.e. on the Ni-Ti alloy side of the joint and the different metal side of the joint. In such case, the large amount of melt thrust to the outside of the joining interface is rapidly solidified, thus preventing the production of diffused brittle reaction phase of Ni-Ti type alloys with the melt. Particularly, it is more effective to bring the heat-radiating portions close to the joining interface so that the thrust-out melt is readily contacted with the heat-radiating portions.

Since the melt thrust to the outside of the components is solidified around the outer circumferential area of the joining interface, and has a normal cast structure, it is possible to retain high strength for the joined parts by finishing the circumferential surface by polishing after cutting off the thrust-cut portion.

Moreover, since the joining parts of both components are heated locally in short time, the deterioration of the characteristics, in particular, the deterioration of shape memory characteristics and superelasticity characteristics due to the influence of heat in areas other than the joint can be prevented. Use of said heat-radiating portions as described makes the process further effective. Moreover, these heat-radiating portions have the effect of preventing deformation in areas other than the neighborhood of the joint in addition to their cooling effect and, thus the joining of precision parts comprising profile materials is also possible.

For the heating method for the joining interface, a conventional resistance welder can be utilized.

The invention will now be illustrated based on the following examples.

EXAMPLE 1

Figure 1:
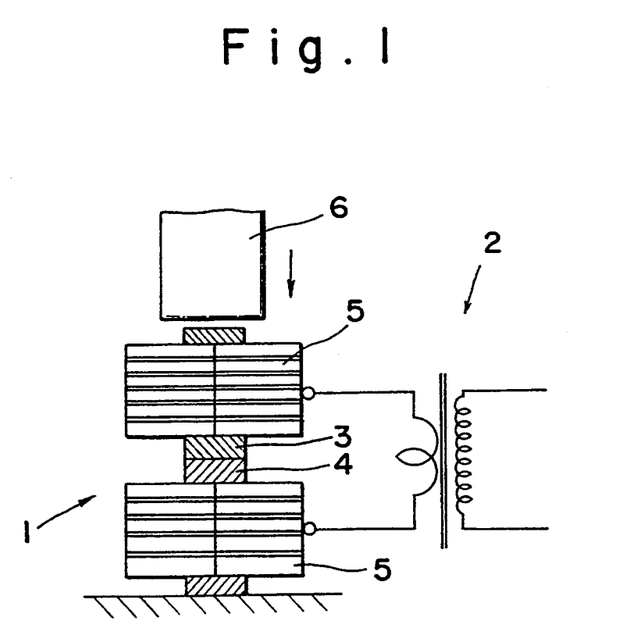
FIG. 1 is an illustration diagram showing a device used for the joining method of the invention.

Using a welder equipped with compression device (1) and welding power source (2) as shown in FIG. 1, the following experiments were conducted.

A superelasticity wire (3) with a wire diameter of 2.6 mm and a length of 20 mm comprising 51.0 at % Ni—balance Ti as a Ni-Ti alloy and each of six different metal wires (4) similarly with a wire diameter of 2.6 mm and a length of 20 mm, the compositions of which are shown in Table 1, were clamped between jigs consisting of air-cooling electrodes (5) as shown in FIG. 1. First, to illustrate the inventive joining method, the end faces of the superelasticity wires and the various metal wires were pressurized to 20 kg/mm², 10 kg/mm² or 3 kg/mm² with pressure device (6), and, in this state, selecting an optimal value of current between 1500 and 3000 A depending on the difference of physical properties of each metal, the current was turned on for 1/20 second for joining. As a comparative joining method, the pressurizing force was decreased to 1.5 kg/mm² for joining both wires under the same conditions except the pressurizing force. Moreover, a conventional joining method, wherein the end face of the superelasticity wire is plated with Ni and each of the different metal wires having the compositions shown in Table 1 are soldered thereto, is exemplified.

Using these joined wires, the tensile strength was measured with both ends clamped in the test device. The results are shown in Table 1, wherein a specimen having a tensile strength of not less than 50 kg/mm² was marked with ⊚, a specimen having not less than 30 kg/mm² and less than 50 kg/mm² with ○, a specimen having not less than 20 kg/mm² and less than 30 kg/mm² with Δ, and a specimen having less than 20 kg/mm² with X. The strength required for practical use is not less than 20 kg/mm².

TABLE 1

| Different type metal (wt. %) | Pressurizing force on joining (kg/mm²) | | | | Plating/ soldering |
|---|---|---|---|---|---|
| | 20 | 10 | 3 | 1.5 | |
| 87Ni—13Cr | ⊚ | ⊚ | ○ | Δ | X |
| 75Ni—25Cu | ⊚ | ○ | — | — | — |
| Fe (SK4) | ○ | ○ | Δ | — | — |
| SUS 304 | ○ | ○ | Δ | — | X |
| Ti | Δ | Δ | Δ | — | X |
| 60Cu—40Ni | ○ | ○ | — | — | — |

As evident from Table 1, all of the joined parts prepared according to the inventive joining method, the pressurizing force on joining being 10 kg/mm², have the strength of not less than 20 kg/mm², which can be said to be sufficiently practical. Whereas, the strength of joined parts prepared according to the conventional soldering method are all low, under 20 kg/mm² and, by the comparative joining method, too, the pressurizing force on joining being as low as 1.5 kg/mm², sufficient strength cannot be obtained.

Figure 2:
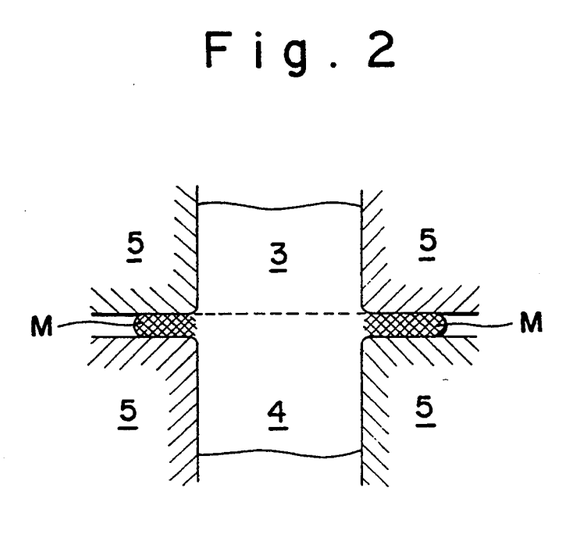
FIG. 2 is a sectional view showing a composite part joined by the joining method of the invention.
Figure 3:
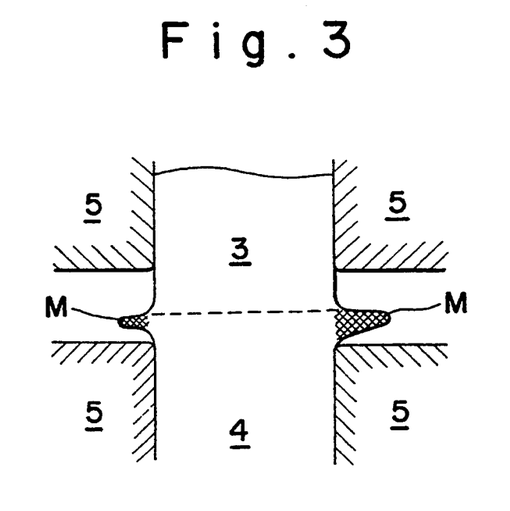
FIG. 3 is a sectional view showing a part joined by the comparative joining method.
Figure 6:
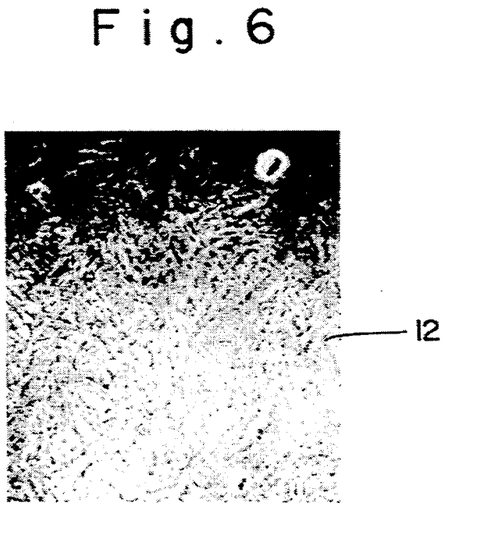
FIG. 6 is an enlarged photograph of metal structure (magnification: 700 times) showing the hot forged structure of 51.0 at % Ni-Ti alloy in the composite part of FIG. 4.

Moreover, photographs of welded structures of the inventive joined parts when using 87Ni-13Cr wire as a mating material with Ni-Ti alloy (51.0 at % Ni-balance Ti) wire at a pressurizing force of 20 kg/mm² are shown in FIG. 2 and FIG. 3, and a photograph of a welded structure of a comparative joined part when joined at a pressure of 1.5 kg/mm² is shown in FIG. 6.

According to FIG. 2, the reaction phase of both alloys is thrust to the outside of the joined parts, and further, according to FIG. 3, the joined interface being enlarged, it can be seen that an about 10 μm thick melt forged structure (11) is formed at the joined interface and, on either side, a hot forged structure (12) of 51.0 at % Ni-Ti alloy on one side and a hot forged structure (13) of 87Ni-13Cr on the other side are formed.

Figure 4:
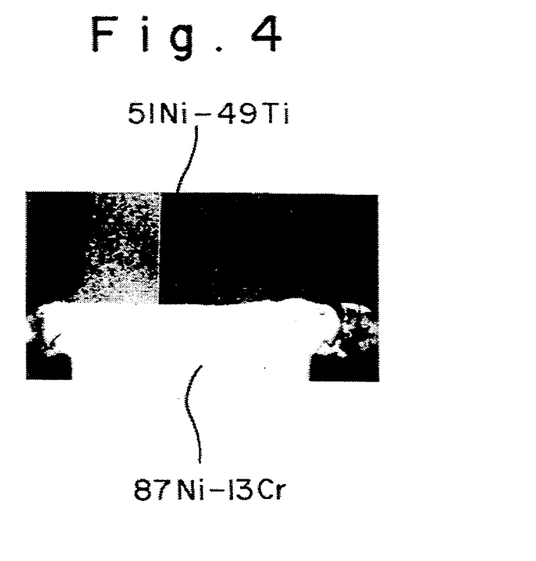
FIG. 4 is a photograph of metal structure (magnification: 17 times) showing the interfacial area of a composite part of 51.0 at % Ni-Ti joined to an 87 wt % Ni—13 wt % Cr alloy by the joining method of the invention.
Figure 5:
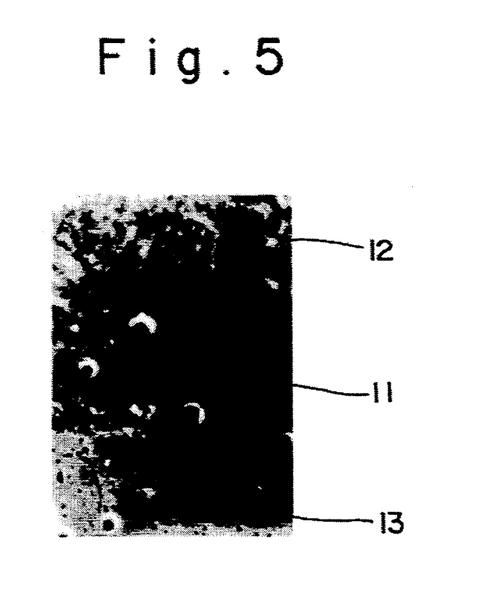
FIG. 5 is a photograph of metal structure (magnification: 1500 times) the detailing interfacial area of the joined parts in FIG. 4.

Moreover, microscopic structural photographs of the hot forged structure (12) of said 51Ni-Ti alloy and the base material structure (14) of 51Ni-Ti alloy not subjected to the hot forging are shown in FIG. 4 and FIG. 5, respectively.

On the contrary, according to the structural photograph in FIG. 6, it is evident that the reaction phase is left behind, inside the joined interface. Namely, it can be said that, because of the low pressurizing force and/or insufficient formation of the hot forged structure, the reactively fused phase was solidified in place, in the area of the joint.

EXAMPLE 2

Next, comparing a composite wire of SUS 304 and a superelasticity wire comprising 51.0 at % NiTi alloy joined at a pressurizing force of 20 kg/mm² or 1.5 kg/mm², and a composite wire joined by the conventional plating/soldering method, all as shown in Table 1, the repeated bending test, which consists of bending the specimen through an angle of 90° each in front and behind (total 180°) with the position of joined interface as the center was performed at a rate of 30 times/min, repeated 240 times.

As a result, the composite wire by the inventive joining method prepared at a pressurizing force of 20 kg/mm$^2$ recovered completely to the original shape without any deformation after completion of the test, and the superelasticity characteristic showed no deterioration. However, the composite wires prepared by the comparative joining method at a pressurizing force of 1.5 kg/mm$^2$ and by the conventional plating/soldering method were ruptured at the joined interface during the test.

EXAMPLE 3

The following experiments were performed with the welder shown in FIG. 1.

A round wire with a diameter of 1.5 mm and a length of 40 mm comprising 50.8 at % Ni-balance Ti was subjected to memory treatment in linear shape for 30 minutes at 500° C. (hereinafter, round wire) was used as a Ni-Ti alloy, and two profile wires for the rim of spectacle frame with a length of 20 mm comprising Monel (hereinafter, profile wire) were used as the different metal.

Figure 8:
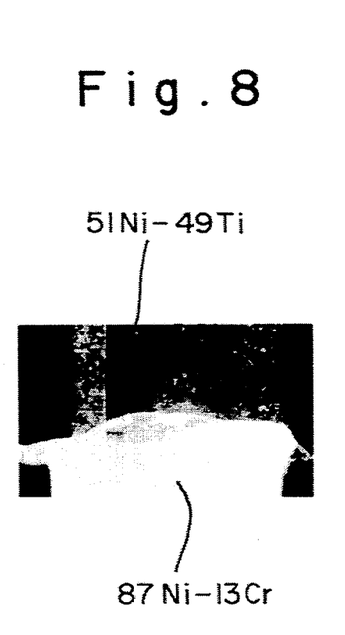
FIG. 8 is a photograph of metal structure (magnification: 17 times) of the interfacial area of composite parts of 51.0 at % Ni-Ti joined to 87 wt % Ni—13 wt % Cr alloy by the comparative joining method.
Figure 9:
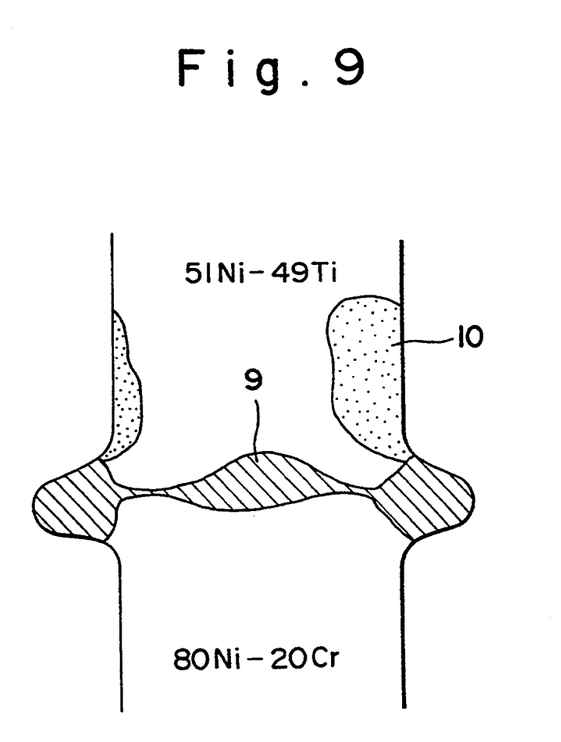
FIG. 9 is an illustration diagram of the metal structure obtained in composite parts when 51.0 at % Ni-Ti is joined to 80 wt % Ni 20 wt % Cr by conventional upset butt welding.
Figure 10:
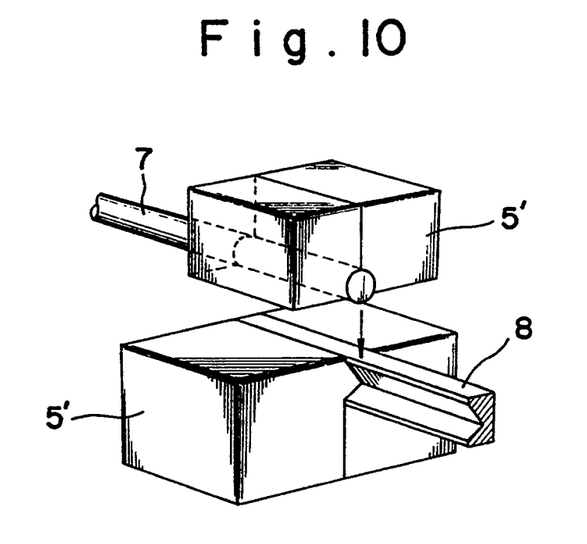
FIG. 10 is an illustration diagram showing the joining jig used in Example 3.
Figure 11:
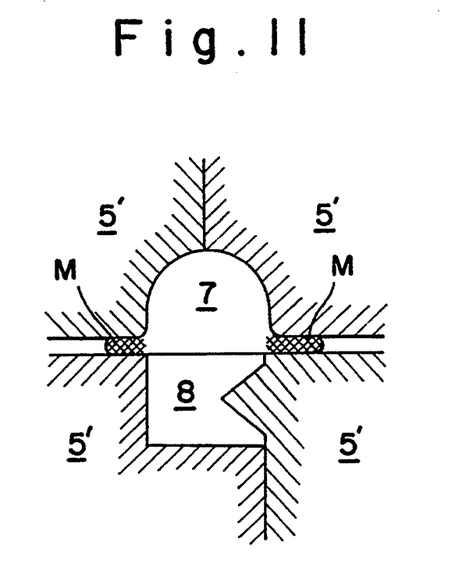
FIG. 11 is a sectional view showing the joined parts as prepared in the joining test of Example 3.

After being clamped between air-cooled electrode jigs (5') as shown in FIG. 8 so as to join the side faces one another by overlapping the tip portion of the profile wires (8) on both ends of the round wire (7) by 5 mm, respectively, a current of 1200 A was applied for 1/30 second in the state of being pressurized at 10 kg/mm$^2$ to complete the joining.

Next, after the thrust-out portion thrust out from the joined interface was cut off and polished, each profile wire on both sides was chucked, and the repeated twisting test performed, twisting the specimen by an angle of 120° both to the right and left (total 240°) in the axial direction at a rate of 10 times/min, repeated 1,000 times. As a result, the joined parts were not ruptured and the superelasticity characteristic showed hardly any deterioration.

In the manner disclosed herein, according to the inventive joining method, the different metal materials and Ni-Ti alloy materials can be joined together in high strength without any adverse influence on the superior characteristics of Ni-Ti alloys. Whereas, by the comparative joining method and the conventional joining method, the joint strength was too low to perform the repeated bending test.

As described, in accordance with the invention, since Ni-Ti alloys having superior characteristics such as shape memory characteristics and superelasticity characteristics can be easily joined with different metals in high strength without deterioration of the unique Ni-Ti alloy characteristics, the invention has remarkable potential for widely spreading the use of Ni-Ti alloys material, and the like.

What is claimed is:

1. A method for forming a joined part by joining a Ni-Ti alloy with a different metal, comprising the steps of contacting the surfaces of said Ni-Ti alloy and said different metal to be joined;

forming a melt-forged structure interface along said surfaces to be joined by supplying heat sufficient to cause reactive fusion of said Ni-Ti alloy and said different metal along said interface;

applying simultaneously sufficient heat and pressure to the area of said Ni-Ti alloy bordering said interface and to said different metal bordering said interface such that a hot-forged structure of Ni-Ti is formed on the side of the interface whereon said Ni-Ti alloy is located and a hot-forged structure of said different metal is formed on the side of the interface whereon said different metal is located.

2. A method for forming a joined part by joining a Ni-Ti alloy with a different metal, comprising the steps of contacting the surfaces of said Ni-Ti alloy and said different metal to be joined;

forming a melt-forged structure interface along said surfaces to be joined, by supplying heat sufficient to cause reactive fusion of said Ni-Ti alloy and said different metal along said interface;

applying simultaneously sufficient heat and pressure to the area of said Ni-Ti alloy bordering said interface and to said different metal bordering said interface such that a hot-forged structure of Ni-Ti is formed on the side of the interface whereon said Ni-Ti alloy is located and a hot-forged structure of said different metal is formed on the side of the interface whereon said different metal is located;

wherein during the process of forming said melt-forged structure by reactive fusing, sufficient pressure, not less than 2 Kg/mm$^2$, is applied across said interface such that a thrust-out portion having a melt-forged structure is formed around the outer circumference of the interface.

3. The method of claim 2 further comprising the steps of removing said thrust-out portion from said joined part and finishing said part by polishing.

4. A method for forming a joined part by joining a Ni-Ti alloy with a different metal, comprising the steps of contacting the surfaces of said Ni-Ti alloy and said different metal to be joined;

forming a melt-forged structure interface along said surfaces to be joined, by applying heat sufficient to cause reactive fusion of said Ni-Ti alloy and said different metal along said interface;

applying simultaneously sufficient heat and pressure to the area of said Ni-Ti alloy bordering said interface and to said different metal bordering said interface such that a hot-forged structure of Ni-Ti is formed on the side of the interface whereon said Ni-Ti alloy is located and a hot-forged structure of said different metal is formed on the side of the interface whereon said different metal is located;

wherein during the process of forming said melt-forged structure by reactive fusing, sufficient pressure, not less than 2 Kg/mm$^2$, is applied across said interface such that a thrust-out portion having a melt-forged structure is formed around the outer circumference of the interface; and wherein said thrust out portion is contacted with a heat-conducting and heat-radiating structure such that said thrust out portion is rapidly solidified.

* * * * *